United States Patent [19]

Moriki et al.

[11] Patent Number: 4,622,451
[45] Date of Patent: Nov. 11, 1986

[54] APPARATUS FOR REBUILDING WORN SHOE GROUSER FOR TRACK CHAIN

[75] Inventors: Yasumitsu Moriki; Masahiro Sakurai, both of Tokyo, Japan

[73] Assignee: Maruma Jyusharyo Kabushiki Kaisha, Tokyo, Japan

[21] Appl. No.: 698,934

[22] Filed: Feb. 7, 1985

[30] Foreign Application Priority Data

Jun. 22, 1984 [JP] Japan .................... 59-127588

[51] Int. Cl.⁴ .............................. B23K 9/04
[52] U.S. Cl. .................. 219/76.1; 219/125.1; 228/119
[58] Field of Search ............... 219/73.21, 76.1, 76.14, 219/77, 125.1; 228/119, 165, 173.1, 174

[56] References Cited

U.S. PATENT DOCUMENTS 2,927,992 3/1960 Bateman ............... 219/125.1
3,230,616 1/1966 Janssen ................. 228/119

FOREIGN PATENT DOCUMENTS 210858 6/1984 Fed. Rep. of Germany ... 219/76.14
507419 4/1976 U.S.S.R. .................. 228/119

*Primary Examiner*—E. A. Goldberg
*Assistant Examiner*—C. M. Sigda

*Attorney, Agent, or Firm*—Robert E. Burns; Emmanuel J. Lobato; Bruce L. Adams

[57] ABSTRACT

An improved apparatus for rebuilding worn shoe grouser for track chain by welding operation is disclosed. The worn part of shoe is cut off and replacement lug is placed on grouser so that the welding end face of the former comes in tight contact with the welding end face of the latter while they are held between the lug holding member and the shoe holding member. The shoe holding member is adapted to move forward and backward via a shoe supporting member by means of a hydraulic cylinder and the whole assembly of hydraulic cylinder, shoe supporting member, shoe holding member and lug holding member is turnable about the axis of rotary shafts by actuating the turning mechanism. While replacement lug and grouser are brought in firm contact with one another, welding operation is carried out over the one welding area on shoe to be rebuilt. After completion of welding operation the turning mechanism is actuated by rotating a handle so that the whole assembly is turned upside down whereby another welding operation is carried out over the other welding area. The lug holding member is formed with a groove on the one side into which replacement lug is fitted, while it includes a rotary shaft on the other side so that the assembly can be turned. Plural combinations of lugs and grousers may be arranged one after another with spacers interposed therebetween.

12 Claims, 9 Drawing Figures

APPARATUS FOR REBUILDING WORN SHOE GROUSER FOR TRACK CHAIN

BACKGROUND OF THE INVENTION

1. Field of the Invention

The present invention relates to an apparatus for rebuilding a worn track shoe for a line of track chain usable for a construction machine or the like and more particularly to improvement of or relating to an apparatus for rebuilding a worn shoe by a welding operation, werein an assembly of a shoe and a replacement lug is caused to turn upside down after completion of a welding operation over one welding area while they are brought in firm contact with one another.

2. Description of the Prior Art

As is well known, a shoe mounted on a line of track chain for a construction machine such as bulldozer or the like has a grouser projected outwardly of the surface and the grouser tends to wear increasingly as the construction machine continues to operate. Once the grouser has worn, a high intensity of tracting force fails to be generated due to reduced depth of driving of the grouser into the ground, resulting in decreased capability of excavating and degraded operational efficiency. For these reasons worn shoes should be repaired or rebuilt when the extent of wearing reaches a predetermined level during running operation. Rebuilding of a worn shoe is usually carried out by way of the steps of cutting off the worn part of grouser, fitting a replacement lug having a certain height to the latter and then butt welding an assembly of replacement lug and grouser along the welding area. Due to the necessity for welding operations on both the sides of the assembly, the latter is required to turn upside down after completion of the welding operation over the welding area on the one side. To carry out rebuilding of a worn shoe, the conventional apparatus is generally operated such that after welding on the one side of the assembly, the assembly is removed from the fitting jig, it is then turned upside down and finally it is mounted on the jig again. This leads to lower operational efficiency.

Prior to the welding operation the worn part of the grouser is usually cut off by means of a gas cutter and the shoe is gradually deformed during the cutting operation under the influence of heat at an elevated temperature. To eliminate deformation, the rebuilt shoe is hitherto straightened with the aid of a gate type press or the like and thereafter it is subjected to welding. However, it has been found that the rebuilt shoe resumes the original deformed state during the welding operation or before it is assembled with a line of track chain. For this reason a repaired shoe fails to be correctly fitted to track chain, causing an occurrence of loosening of tightened bolts, disconnection of the shoe from the track chain or the like malfunction.

SUMMARY OF THE INVENTION

Hence, the present invention has been made with the foregoing background in mind and its object resides in providing an improved apparatus for rebuilding a worn shoe by a welding operation without any necessity for dismounting an assembly of the shoe and replacement lug after completion of welding over the welding area on the one side.

It is another object of the present invention to provide an improved apparatus for rebuilding a worn shoe which is operated at a high operational efficiency.

It is another object of the present invention to provide an improved apparatus for rebuilding worn shoes which assures that plural assemblies of shoe grousers and replacement lugs are arranged one after another with a spacer interposed between the adjacent ones so that they are rebuilt merely by means of a single welder head.

To accomplish the above objects there is proposed according to the present invention an apparatus for rebuilding worn shoe grousers for a line of track chain by a welding operation essentially comprising a lug holding member having a groove formed therein so as to allow a replacement lug to be fitted into the groove, the lug holding member including a rotary shaft extending at a right angle relative to the groove on the opposite side to the latter, a shoe holding member located opposite to the groove of the lug holding member, the center line of the shoe holding member being held in alignment with the axis of the rotary shaft of the lug holding member, a shoe supporting member made integral with the shoe holding member, a thrusting mechanism for displacing the shoe holding member forward and backward along the axis of the rotary shaft, and a turning mechanism for turning an assembly of thrusting mechanism, shoe supporting member, shoe holding member, shoe grouser, replacement lug and lug holding member so that the shoe grouser and replacement lug are turned upside down after completion of the welding operation over the welding area on the one side while they are brought in firm contact with one another between the shoe holding member and the lug holding member.

The lug holding member, the shoe holding member and the thrusting mechanism are arranged on the same axis of rotary shafts in the symmetrical relation whereby the whole assembly is easy to be turned upside down by rotating a handle.

To allow plural combinations of shoe grousers and replacement lugs to be rebuilt on a single apparatus they are arranged one after another with their center line located in alignment with the axis of rotary shafts while a spacer serving also as shoe holding member is interposed between the adjacent combinations. In this case each of the spacers has a groove formed on the one side so as to allow a replacement lug to be fitted thereto, while it includes a shoe thrusting member on the other side.

Preferably, the arrangement is made such that a single welder head is disposed to move along a rail which extends through a plurality of apparatuses so that the latter are operated merely by using a single welder head.

The apparatus is preferably provided with moving means such as casters or the like rolling means so that it is movable relative to a welding machine.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

FIG. 1 is a front view of the apparatus.

FIG. 2 is a plan view of the apparatus in FIG. 1.

FIG. 3 is a partial sectioned side view of the apparatus, particularly, illustrating on an enlarged scale essential components constituting the same.

FIG. 4 is a fragmental enlarged perspective view of the apparatus, particularly illustrating a combination of shoe grouser and replacement lug with a holder disposed thereby.

DESCRIPTION OF THE PREFERRED EMBODIMENTS

Now, the present invention will be described in a greater detail hereunder with reference to the accompanying drawings which illustrate prefered embodiments thereof.

Figure 1:
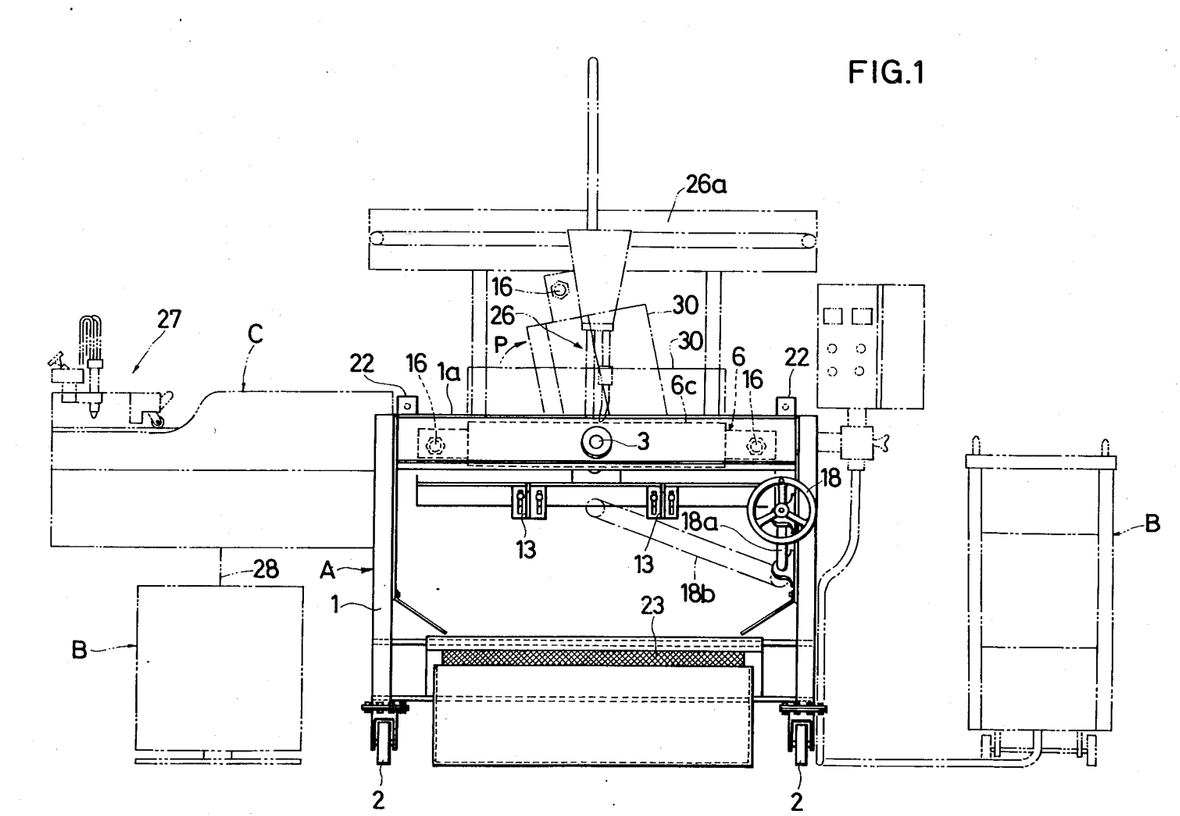
FIGS. 1 to 4 illustrate an apparatus according to an embodiment of the invention.
Figure 2:
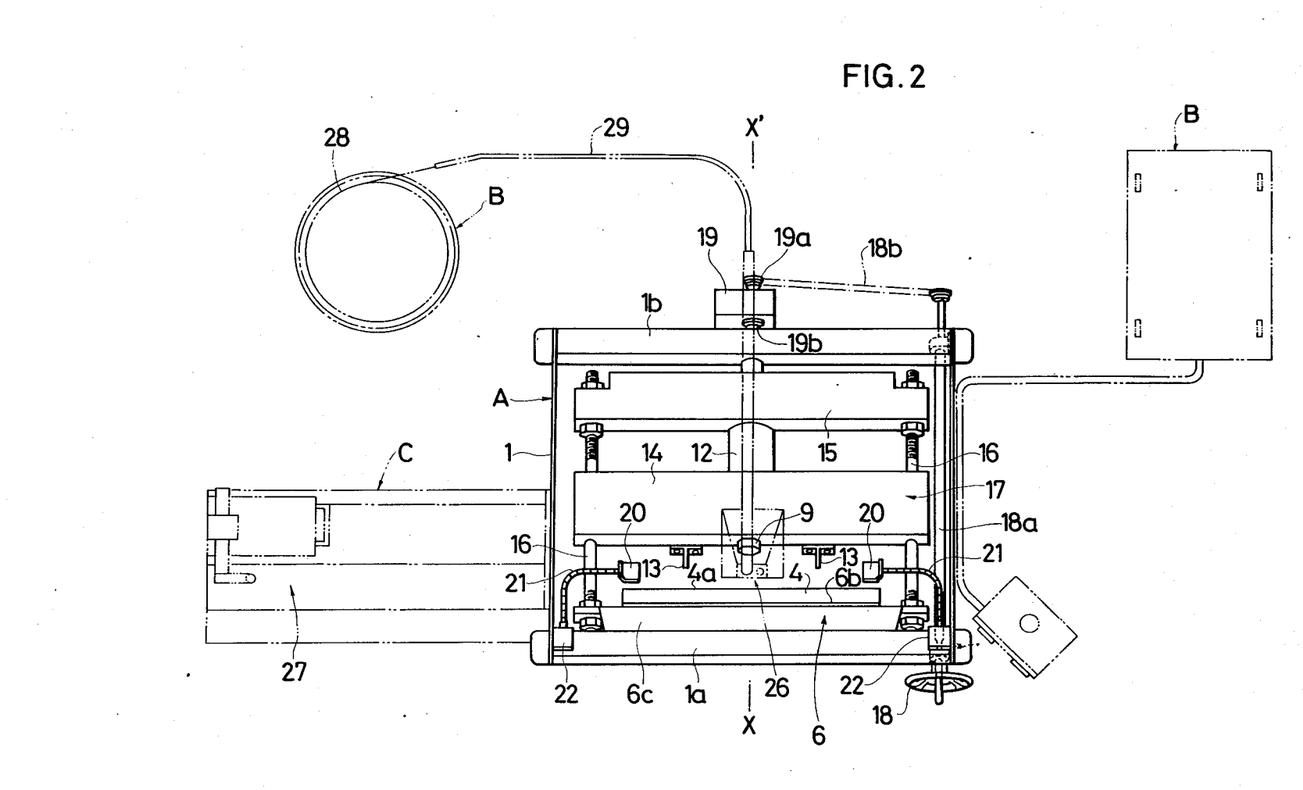

The apparatus of the invention as identified by reference letter A includes a housing 1 which is provided with traverse frames 1a and 1b and moving wheels 2 such as casters or like means. Thus, the apparatus A is movable relative to a welding machine B as identified by chain lines in FIGS. 1 and 2. A grouser cutting device C is attached to the frame 1 of the apparatus A, as illustrated by chain lines in FIGS. 1 and 2.

A lug holding member 4 is arranged on the fore traverse frame 1a to turn with a rotary shaft 3 and has a groove 5 for holding a lug 32 while fitting the outer edge 32a thereof in the groove 5 formed on the rear side 4a of the lug holding member 4. In the drawings reference numeral 6 designates a mounting member for replaceably mounting the lug holding member 4, reference numeral 6a designates a fastening bolt, reference numeral 6b designates a mounting head made integral with the shaft 3 and reference numeral 6c designates a mounting bar through which the shaft 3 extends and reference numeral 6d designates a mounting sleeve which is fitted through the center hole 7 on the traverse frame 1a. The sleeve 6d serves to rotatably hold the rotary shaft 3. Further, reference numeral 8 designates a set screw for preventing the rotary shaft 3 from being disconnected from the sleeve 6d.

Reference numeral 9 designates a shoe holding member which is secured to the foremost end of the piston rod 12a of the hydraulic cylinder 12 firmly assembled with the rotary shaft 11 which is rotatably inserted through a center hole 10 on the rear transverse frame 1b. The center hole 10 is located on the extension line extending from the axis of the rotary shaft 3. The lug holding member 4, the shoes holding member 9 and the cylinder 12 are arranged on the same axis X—X' of the rotary shafts 3 and 11 in the symmetrical relation. Reference numeral 13 designates a shoe supporting member fixedly attached to the guide bar 14 of the shoe holding member 9. The guide bar 14 is secured to the shoe holding member 9 so that it moves in the direction of the axis X—X' of the rotary shafts 3 and 11 while it is carried by means of connecting rods 16 which serve to operatively connect the mounting bar 6c of the lug holding member 4 to the bar 15 which is integrally assembled with the rotary shaft 11 and the hydraulic cylinder 12. It should be noted that the connecting rods 16 serve also for guiding movement of the guide bar 14. The bars 6c, 14 and 15 are turned together with the connecting rods 16 about the rotary shafts 3 and 11. Thus, a rotary frame 17 is constituted by these members in a symmetrical relation relative to the axis X—X'. The rotary shaft 11 of the shoe holding member 9 is caused to rotate by means of a combination of shaft 18, handle shaft 18a, endless chain 18b and shafts 19a and 19b in the speed reduction mechanism 19.

Reference numeral 20 designates a spilling protector adapted to abut against both of the ends of the welding area 33 as defined between the grouser 31 and the replacement lug 32. The protector 20 serves to inhibit molten metal from spilling over both of the ends of the welding area 33 and it is carried on the uppermost end of a flexible arm 21 which extends upwardly of the magnet 22 on the housing 1. Reference numeral 23 designates a flux screen located at the lower part of the housing 1. The screen 23 serves to separate flux F into finer portions 24 and coarser portions 25 after completion of welding operation.

Reference numeral 26 designates a welder head movable on the rail 26a of the welding machine B in the transverse direction and reference numeral 27 designates a gas cutter in the grouser cutting device C for cutting off the worn part of the grouser 31. In view of the fact that the shoe 30 is deformed under the influence of heat at an elevated temperature during the cutting operation, the gas cutter 27 is adapted to carry out the operation while following the configuration of the rear surface 30b of the shoe 30.

Reference numeral 28 designates a welding rod which is fed to the welder head 26 through the guide 29.

Figure 3:
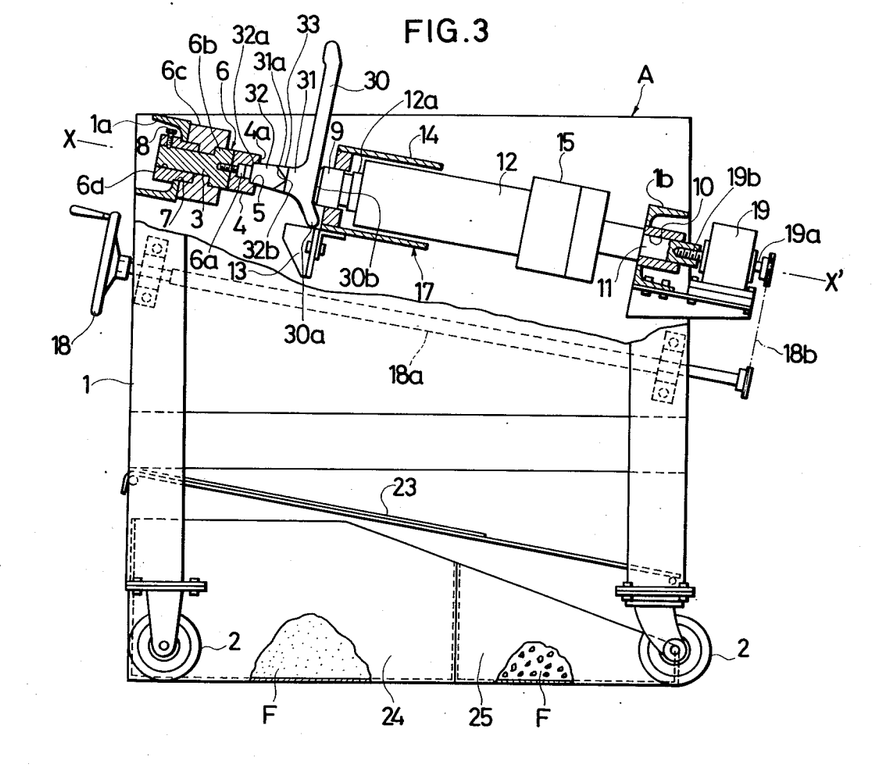

As illustrated in FIG. 3, the rotary shafts 3 and 11 are inclined so that the tapered face in the welding area 33 assumes a horizontal posture. It should of course be understood that the present invention should not be limited only to this but they may be laid in the horizontal direction.

Next, operation of the apparatus of the invention will be described below.

Figure 4:
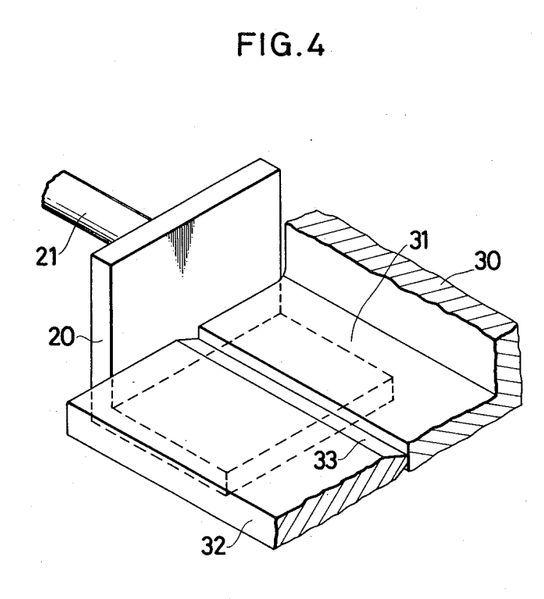
Figure 5A:
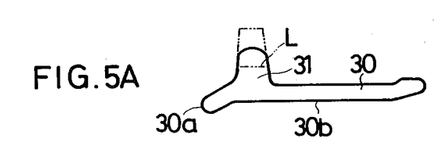
FIGS. 5A to 5C are a side view of a worn shoe illustrating the steps of rebuilding the latter.
Figure 5B:
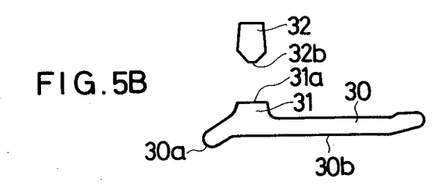
Figure 5C:
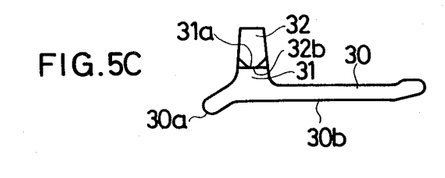
Figure 6:
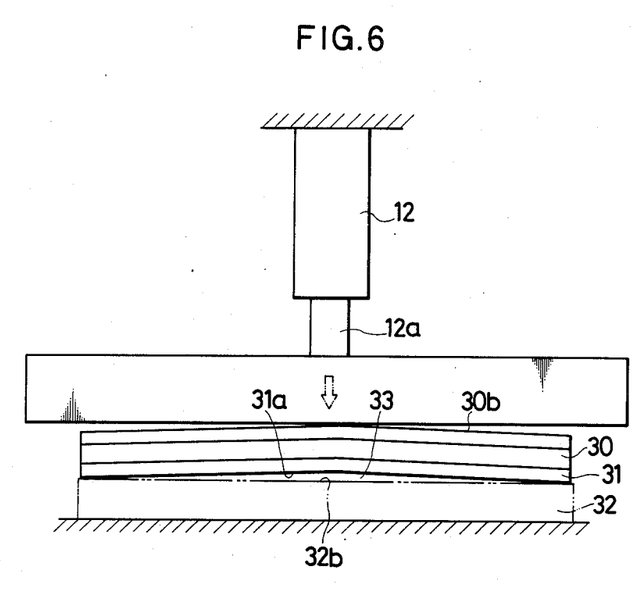
FIG. 6 is a fragmental plan view of the apparatus, particularly illustrating how a deformed shoe is straightened.

Grouser 31 wears in a different way from shoe to shoe. Therefore, there are previously provided several kinds of replacement lugs 32 having different height, for instance, 1", 1½" or the like. Worn grouser 31 is first cut by means of the gas cutter 27 at the position L which is determined in consideration of the height of the replacement lug 32, as schematically illustrated in FIGS. 5A and 5B so that each grouser has the same height after completion of rebuilding. Then, the welding end face 32b of the replacement lug 32 is placed on the cut end face 31a (welding end face) of the grouser 31 under the effect of depressing force and thereafter a welding operation is initiated (see FIG. 5C). Prior to the welding operation, the outer edge 32a of the replacement lug is firmly fitted to the groove 5 of the lug holding member 4 and the end part 30a of the worn shoe 30 is supported on the shoe supporting member 13 which the welding end face 32b of the replacement lug 32 is located opposite to the welding end face 31a of the grouser 31 with the welder head 26 disposed above the welding area 33, as illustrated in FIG. 3. While the above-described positional state is maintained, the hydraulic cylinder 12 is actuated and thereby the piston rod 12a moves forwardly until the shoe holding member 9 abuts against the rear surface 30b of the shoe 30 and the welding end face 31a of the latter comes in firm contact with the welding end face 32b of the replacement lug 32. It should be noted that the shoe 30 is deformed to the configuration as illustrated in FIG. 6 under the influence of heat at an elevated temperature during the cutting operation but this deformation is practically removed by the thrusting operation of the piston rod 12a of the hydraulic cylinder 12. Now, the one welding area 33 is ready to be worked by means of the welding head 26 while the spilling protectors 20 are sealably engaged to both the side ends of the welding area 33 (see FIG. 4).

After completion of the welding operation over the one welding area, the welder head 26 is retracted sideways from the operative position and the handle 18 is then rotated so that the assembly of lug, grouser and others is turned upside down in the direction of the arrow P or in the opposite direction. Thus, the other welding area located reverse to the first mentioned one is subjected to welding operation by means of the welder head 26 while the grouser 31 and the lug 32 are firmly clamped between the shoe holding member 9 and the lug holding member 4.

As will be apparent from the above description, the apparatus of the invention has the following advantageous features. Since the apparatus is constructed such that both welding areas on the assembly of grouser and lug as welded while they are brought in firm contact with one another, it is assured that deformation caused during the cutting operation of shoe is removed to the straight configuration and thereby the rebuilt shoe has substantially the same beautiful appearance as that of a new one. Further, since the welding operation is carried out at the same positional level over both of the welding areas by rotating handle 18 about the rotary shafts which extend at a right angle relative to the welding areas, there is no necessity for dismounting and remounting of the grouser and lug after completion of the welding operation over the one welding area and moreover there is no necessity for readjusting their position after they are turned upside down. As a result, the welding operation can be carried out at an operational efficiency remarkably higher than that in case of conventional apparatus.

Figure 7:
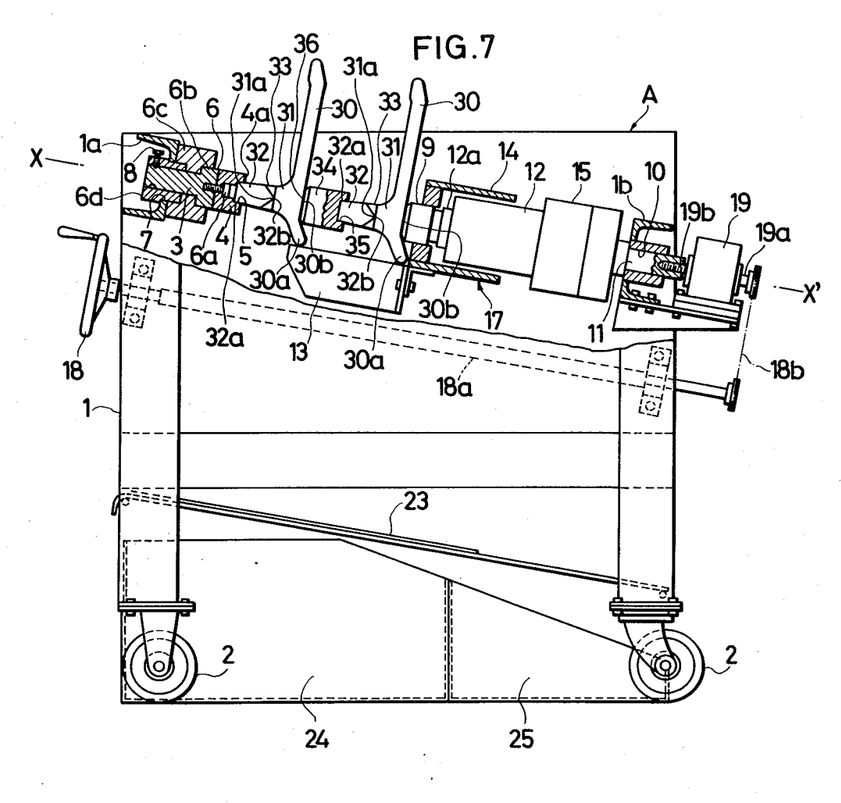
FIG. 7 is a partially sectioned side view of the apparatus according to another embodiment of the invention where plural combinations of shoe grousers and replacement lugs are welded together for rebuilding of worn shoes.

Next, an apparatus according to another embodiment of the invention will be described below with reference to FIG. 7. In this embodiment the apparatus is provided with a spacer 34 of which one side has a groove 35 for receiving a lug therein and of which other side includes a shoe thrusting member 36. It should be noted that the spacer 34 serves also as shoe holding member. As is apparent from the drawing, the spacer 34 is located between the grouser 31 of the fore shoe 30 and the replacement lug 32 of the rear shoe 30 in alignment with the rotary shafts 3 and 11 whereby a welding operation is simultaneously carried out for two worn shoes on the same apparatus. As a result, the welding operation can be achieved at an increased operational efficiency. In the illustrated embodiment, two shoes are mounted on the apparatus for rebuilding work. Alternatively, more than two shoes may be mounted thereon for the same purpose.

Owing to the arrangement that the lug holding member 4, the shoe holding member 9 and the hydraulic cylinder 12 serving as thrust mechanism are disposed on the same axis X—X' in the symmetrical relation, there does not occur fluctuation in weight balance when they are turned upside down. Further, since the shoe and lug are adapted to turn about their center line, they are easy to be turned by rotating the handle 18.

When a plurality of apparatuses of the invention are arranged side by side along the moving rail of the welder head, it is possible to carry out continuous welding for plural combinations of grousers and lugs merely by utilizing a single welder head.

As described above, the apparatus A of the invention is installed separate from the welding machine B. Owing to this type of installation made in this way any other type of welding machine such as link welder, roller welder or the like, each of which is installed for assembling a line of track chain at the position located on an extension line extending from the apparatus, may be employed.

Another advantageous feature of the invention is that both cutting and welding operations can be simultaneously carried out when the apparatus A and the grouser cutting device C are arranged side by side.

What is claimed is:

1. Apparatus for rebuilding worn shoe grousers for a line of track chain by welding operations comprising:
   a framework;
   means for holding an elongate lug having a double bevelled longitudinal edge horizontally in position to be welded to a shoe, said lug holding means being rotatably mounted in said framework for rotation about a horizontally extending axis perpendicular to the length of said lug,
   means for holding a shoe in position to be welded to said lug, said shoe holding means being mounted in said framework for rotation coaxially with said lug holding means and for movement axially toward said lug holding means,
   thruster means for moving said shoe holding means axially toward said lug holding means forcibly to press a lug held by said lug holding means and a shoe held by said shoe holding means together for welding of said lug to said shoe, said thruster means being mounted in said framework for rotation coaxially with said lug holding means and said shoe holding means, and
   means for rotating said lug holding means, said shoe holding means and said thruster means together 180° about said axis between a first position in which said lug is horizontal with a first side of said lug facing upwardly for making a first weld of said lug to said shoe and a second position in which a second side of said lug faces upwardly for making a second weld of said lug to said shoe while maintaining pressure between said shoe and lug.

2. Apparatus according to claim 1, in which said axis is inclined to the horizontal with said lug holding means higher than said thruster means.

3. Apparatus according to claim 1, in which said lug holding means comprises a shaft mounted in said framework, and an elongate member fixed transversely on said shaft and having a longitudinally slot in a side facing said shoe holding means to receive and hold a lug.

4. Apppratus according to claim 1, in which said thruster means comprises a fluid-pressure cylinder and piston mounted in said framework for rotation coaxially with said lug holding means and said shoe holding means.

5. Apparatus according to claim 4, in which said cylinder is mounted for rotation in said framework about said axis and said piston has a piston rod extending toward said lug holding means, and in which said shoe holding means is carried by said piston rod.

6. Apparatus according to claim 5, in which said shoe holding means comprises a crossbar on said piston rod and spaced shoe-supporting members on said crossbar.

7. Apparatus according to claim 4, in which crossbars associated respectively with said lug holding means and said said cylinder of said thruster means are connected by connecting rod parallel to said axis and in which a crossbar associated with said shoe holding means is slidable on and guided by said connecting rods, the assembly comprising said lug holding means, said shoe holding means said cylinder, said piston, said crossbars and said connecting rods being rotatable as a unit about said axis.

8. Apparatus according to claim 1, in which said lug holding means, said shoe holding means and said thruster means, together with a lug held by said lug holding means and a shoe held by said shoe holding means are symmetrical about said axis, whereby the assembly comprising said lug holding means, said shoe holding means, said thruster means, a lug held by said lug holding means and a shoe held by said shoe holder means are balanced with respect to said axis.

9. Apparatus according to claim 1, in which said means for rotating said lug holding means, said shoe holding means and said thruster means comprises a shaft rotatably supported in said framework parallel to said axis, means at one end of said shaft for rotating said shaft and means at another end of said shaft operatively connecting said shaft with said thruster means for transmitting rotary motion of said shaft to said thruster means.

10. Apparatus according to claim 9, in which said operative connecting means includes speed reducing means.

11. Apparatus according to claim 1, further comprising spilling protector means comprising members carried of flexible arms and positionable at opposite ends of the welding region between said lug and said shoe to inhibit molten metal spilling from the ends of said region.

12. Apparatus according to claim 1, further comprising means for holding a second lug and a second shoe in series with said first mentioned lug holding means and shoe holding means, whereby a welding operation can be carried out for two worn shoes.

* * * * *